June 14, 1938.  G. F. DALY  2,120,232
MULTIPLYING MACHINE WITH AUTO-CONTROL
Filed March 14, 1933  11 Sheets-Sheet 4

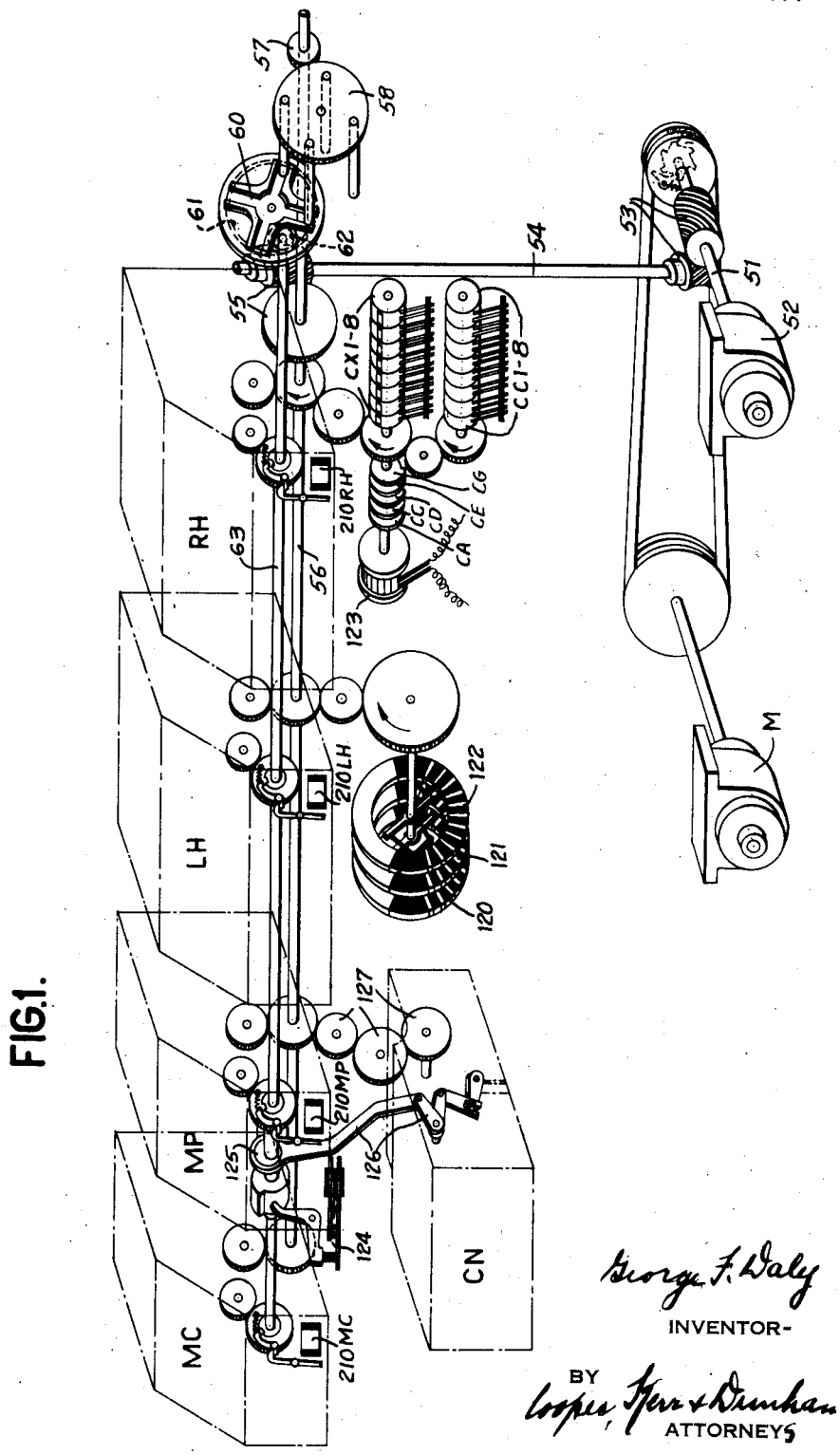

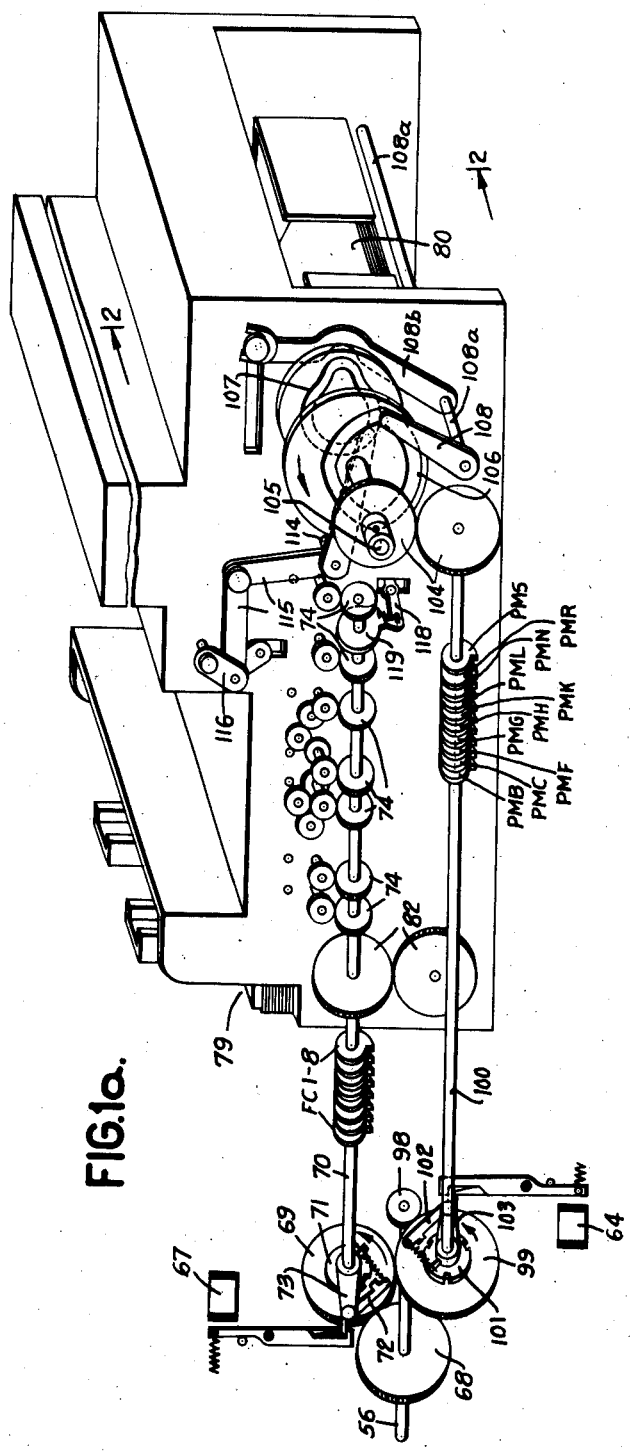

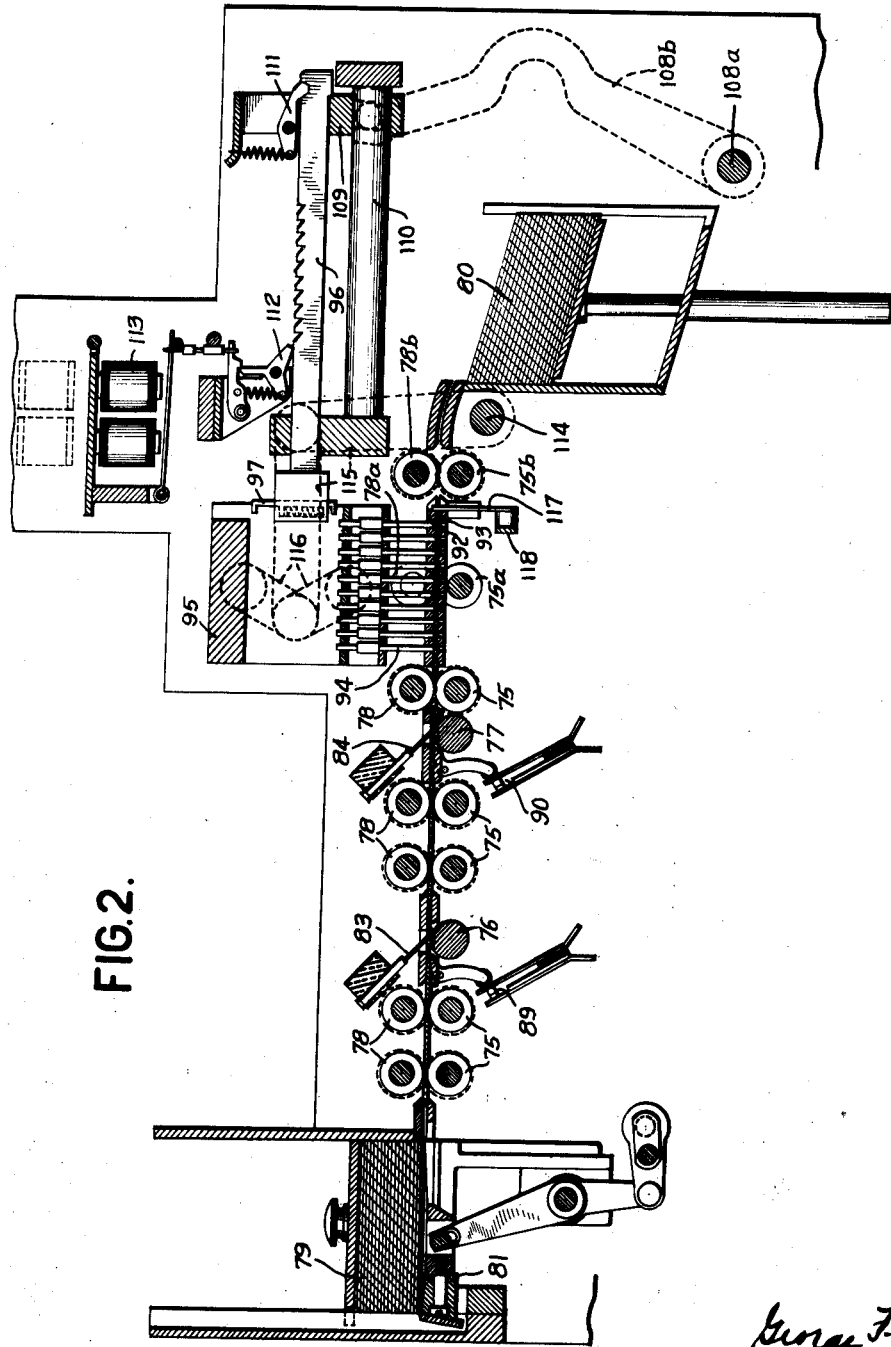

INVENTOR-
George F. Daly
BY
Cooper, Kerr & Dunham
ATTORNEYS

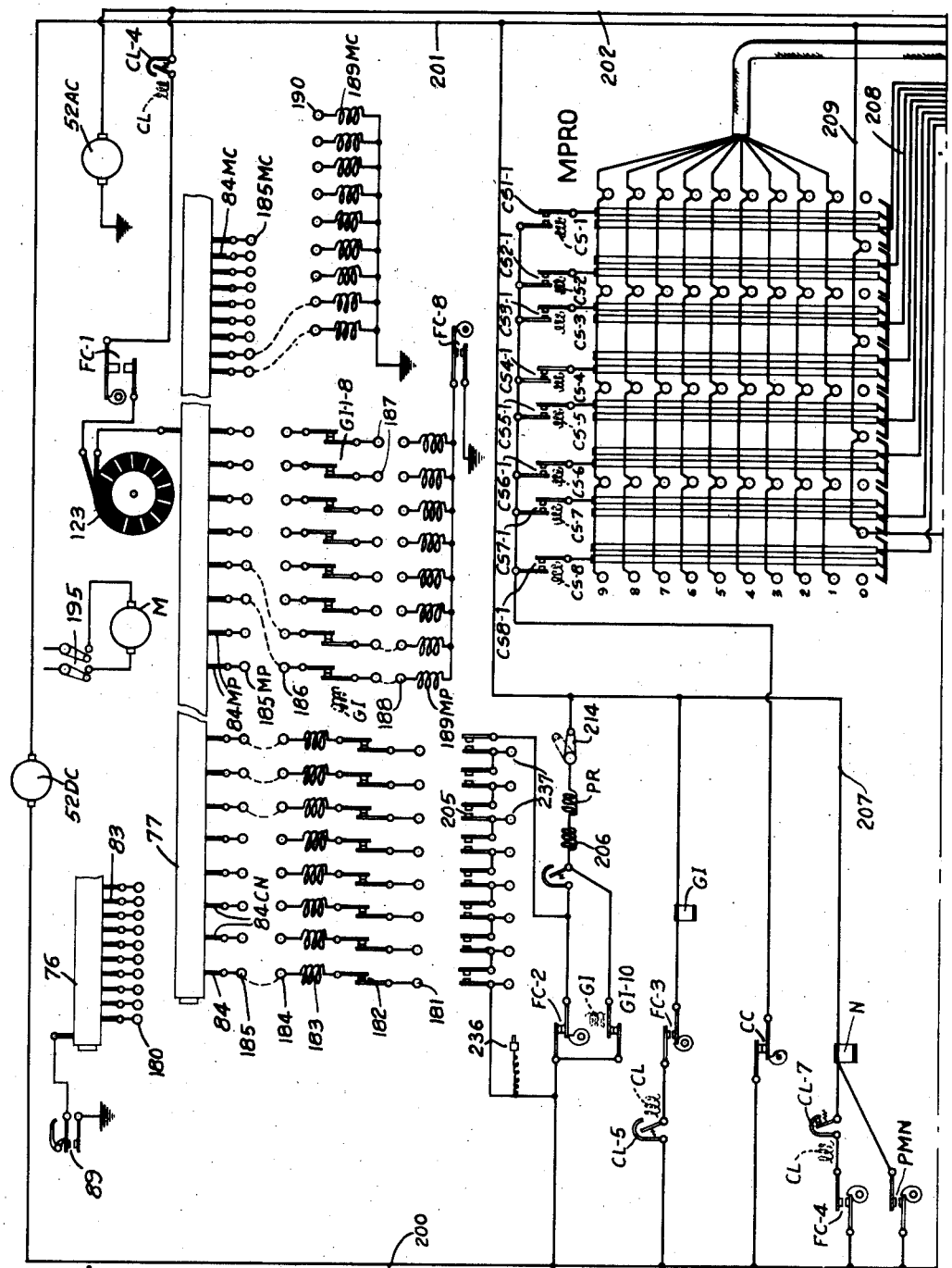

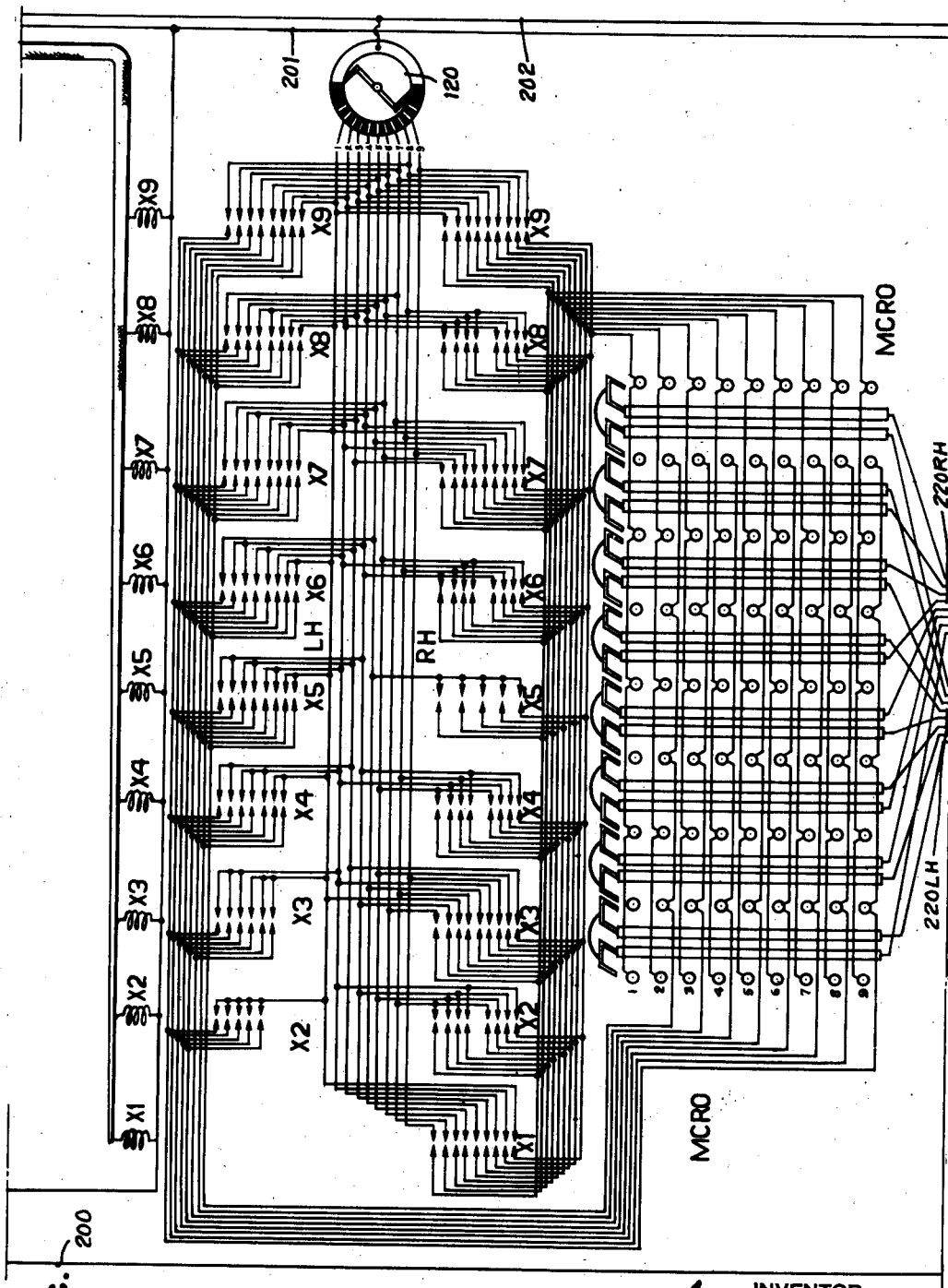

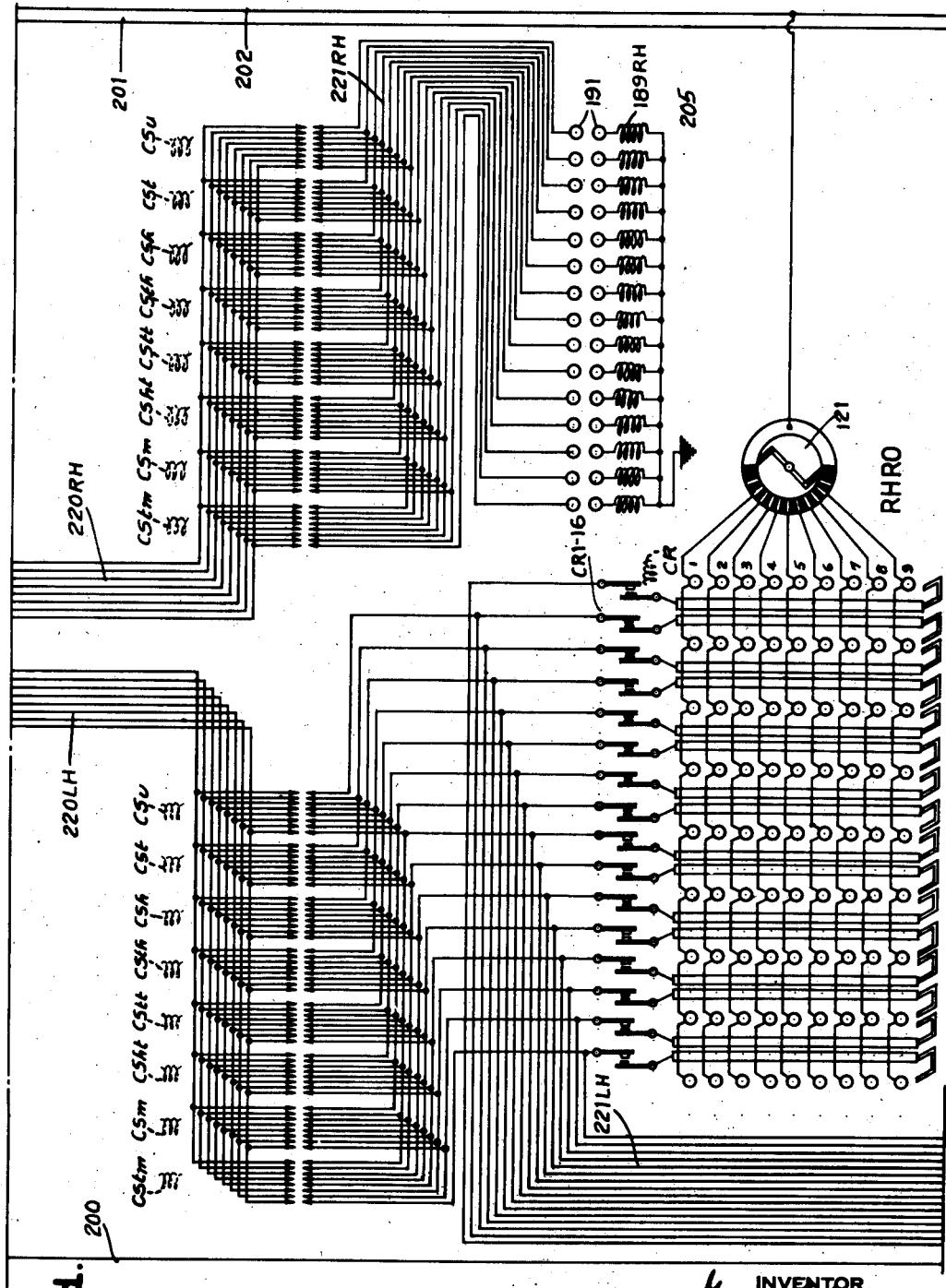

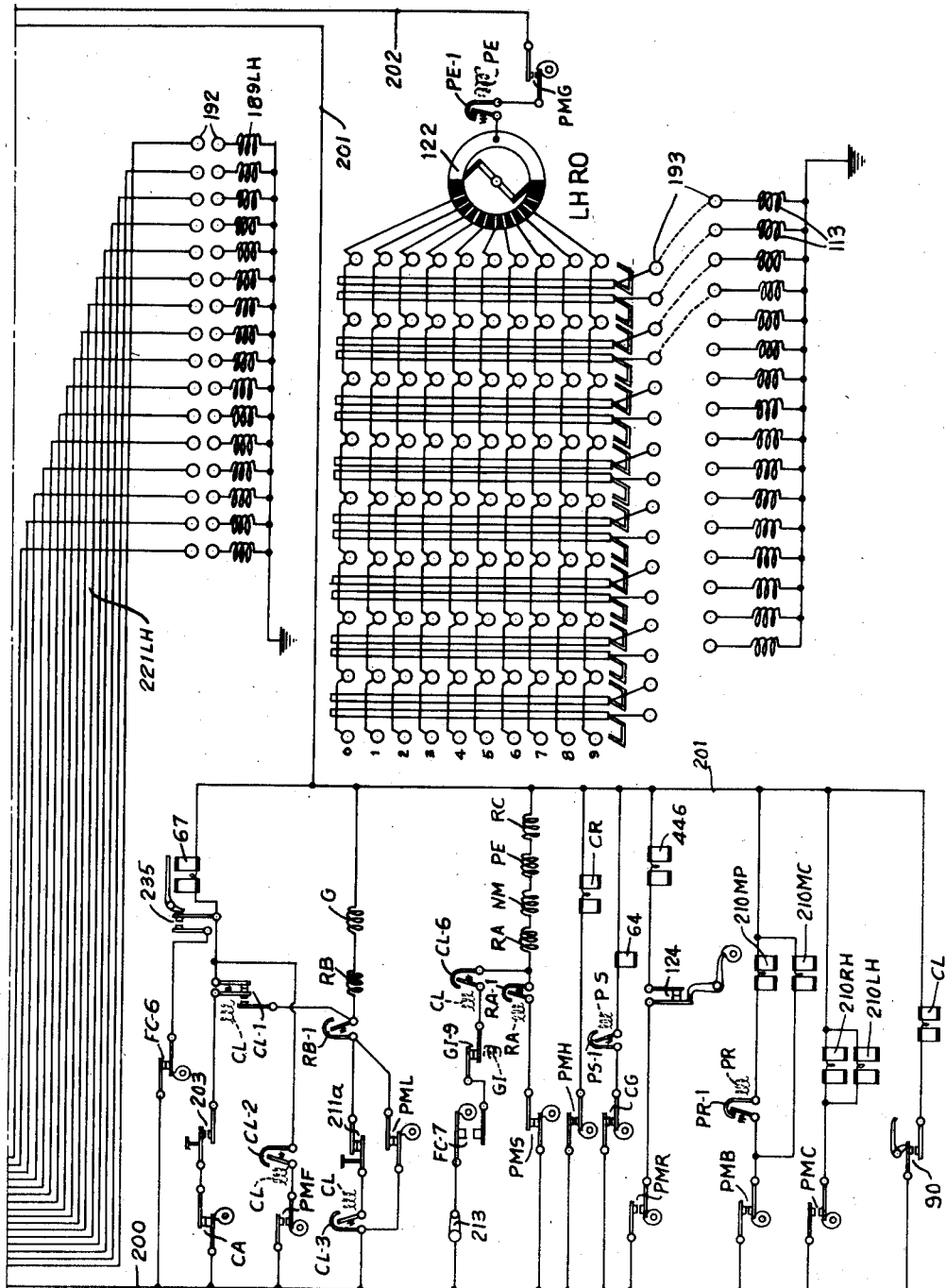

June 14, 1938.  G. F. DALY  2,120,232
MULTIPLYING MACHINE WITH AUTO-CONTROL
Filed March 14, 1933   11 Sheets-Sheet 10

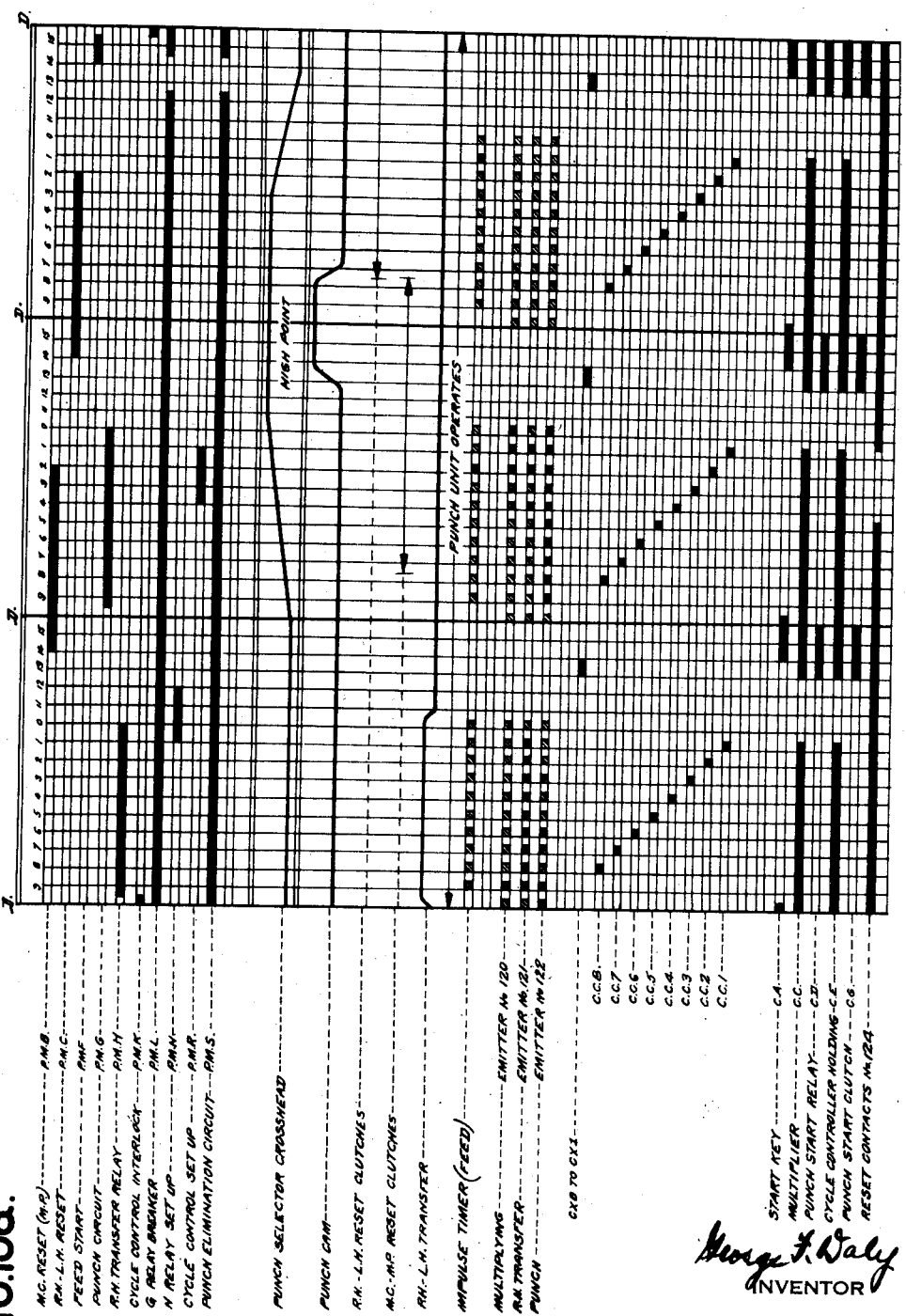

Patented June 14, 1938

2,120,232

UNITED STATES PATENT OFFICE 2,120,232

MULTIPLYING MACHINE WITH AUTO-CONTROL

George F. Daly, Johnson City, N. Y., assignor, by mesne assignments, to International Business Machines Corporation, New York, N. Y., a corporation of New York Application March 14, 1933, Serial No. 660,633

14 Claims. (Cl. 235—61.7)

This invention relates to improvements in record controlled multiplying accounting machines and more particularly relates to improvements in controls for such machines.

The principal object of the present invention resides in the provision of an automatic or group control for a record controlled multiplying accounting machine wherein provision is made for sensing the changes in a group or control number upon the records which pass through the machine and for causing such changes in control or group number to initiate the resetting and zeroizing of the multiplier entry receiving device and to thereafter effect a control which permits a new multiplier which is derived from the record containing the changed control number to be entered into the machine for controlling multiplications with multiplicands derived from the following records of the new group.

A further object of the present invention resides in the provision of an automatic control for a multiplying machine arranged to detect changes in group numbers of records passing through the machine and to modify the operation of the multiplying devices upon such change in group numbers.

A further and more particular object of the present invention resides in the provision of means which automatically suspend one series of multiplications when the group numbers change and for the automatic setting up of parts of the machine in condition to perform a new series of multiplying computations with the further automatic initiation of such new series of multiplying computations.

A further object of the present invention resides in the provision of an improved control for a record controlled accounting machine to enable dummy multiplying operations to be eliminated under certain machine conditions where heretofore the machine ineffectively attempted to perform such operations and consumed operating time of the machine.

A further object of the present invention resides in the provision of a construction of a multiplying accounting machine in which provision is made when handling certain types of records for causing an immediate resumption of card feed without requiring the machine to proceed through preceding dummy multiplying operations before re-initiation of the card feed.

A further object of the present invention resides in the provision of a record controlled multiplying accounting machine wherein improved provisions are made for deriving the multiplier from the leading card of a group and for thereafter suppressing further entries of amounts into the multiplier entry receiving device until the device is reset preparatory to receiving a new multiplier amount from a new record containing a changed control number.

Further and other objects of the present invention will be hereinafter set forth in the accompanying specification and claims and shown in the drawings, which show by way of illustration a preferred embodiment and the principle thereof and what I now consider to be the best mode in which I have contemplated of applying that principle. Other embodiments of the invention employing the same or equivalent principle may be used and structural changes made as desired by those skilled in the art without departing from the present invention and within the spirit of the appended claims.

In the drawings:

Figures 1 and 1a taken together and arranged with Fig. 1a to the right of Fig. 1, show a diagrammatic view of the various units of the machine and the driving devices for the various units;

Fig. 2 is a central transverse sectional view of the card handling, reading and punching section of the machine. This section is taken substantially on line 2—2 of Fig. 1a;

Figure 9B:
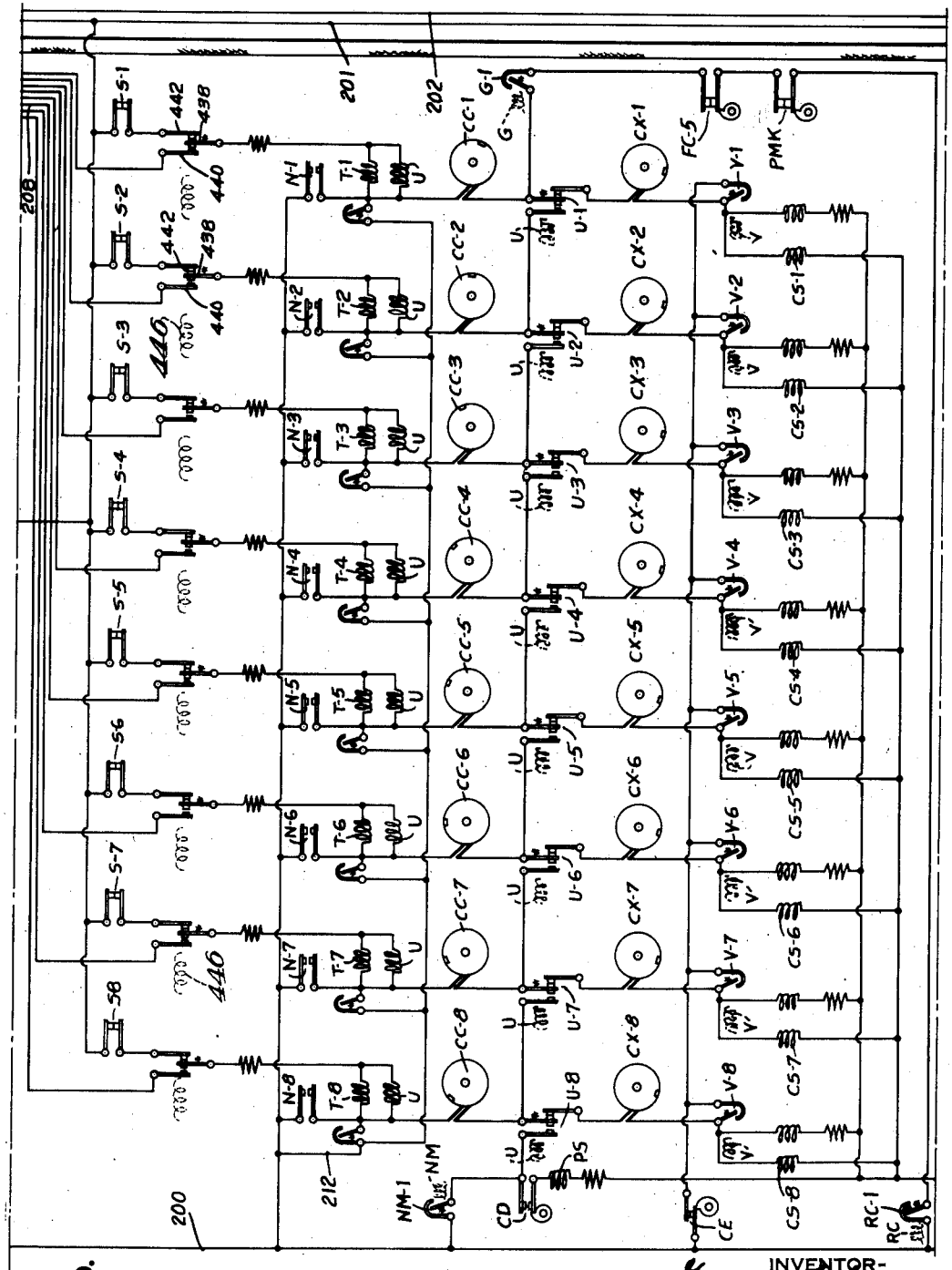
Figure 10:
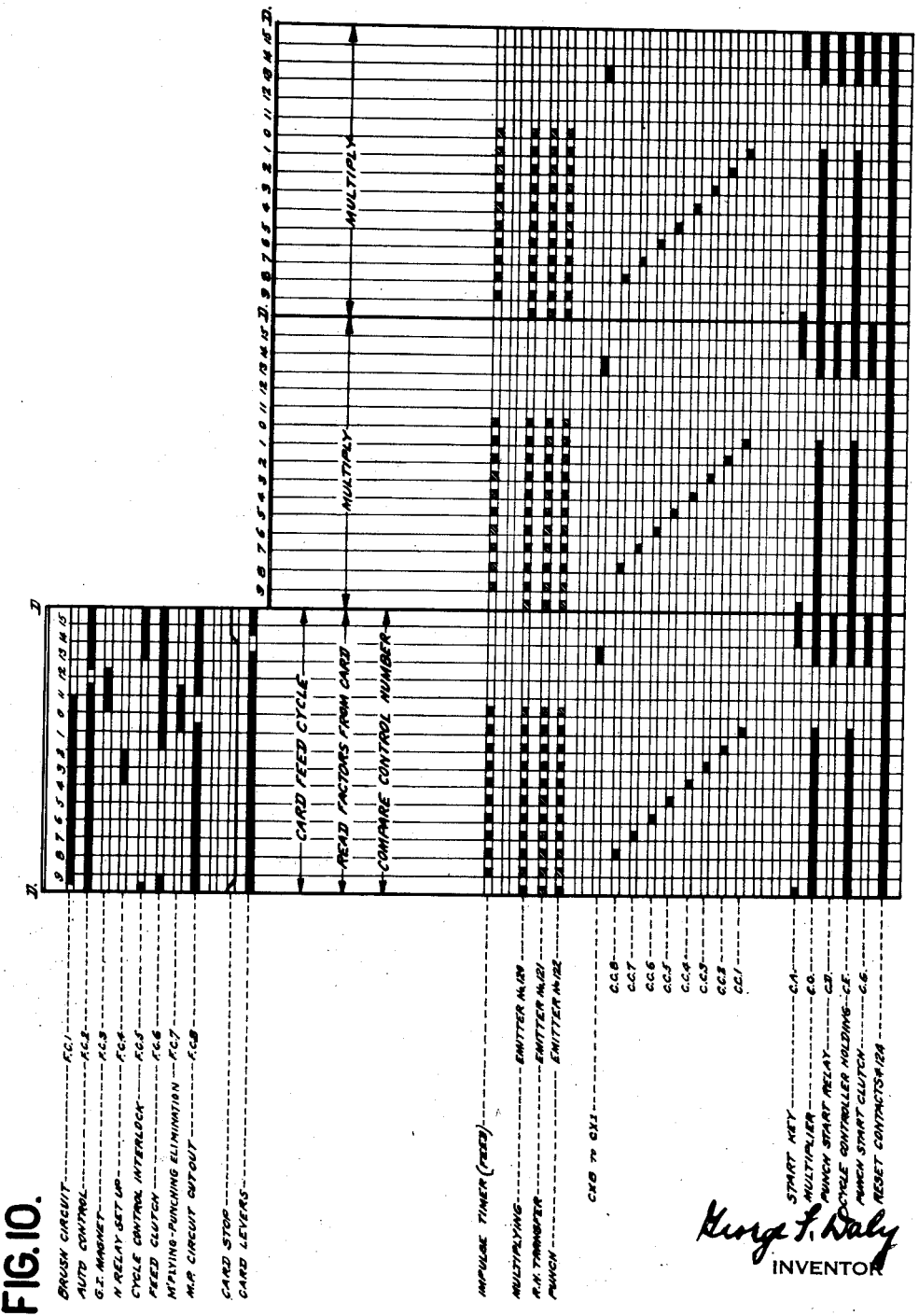

Figs. 9a, 9b, 9c, 9d and 9e taken together and arranged vertically in the order named, show the circuit diagram of the machine; and Figs. 10 and 10a taken together show the timing diagram of the machine.

Before describing the details of the various parts of the machine, a general description will be given of the various units and their location in the machine. The machine embodies a card feed, card handling and a punching section, which sections are shown in the upper right hand corner of Fig. 1a and also shown in transverse cross-section in Fig. 2. This part of the machine is arranged to feed cards, derive readings therefrom and to afterwards pass the cards into a punching mechanism where each card is punched. This punching mechanism is a punching mechanism of the gang punch type wherein there is a preliminary selection of punches for punching and a subsequent concurrent displacement of the selected punches through the card.

The machine also includes a number of accumulators and/or receiving devices as follows. On Fig. 1 there is shown the usual RH accumulator and an LH accumulator designated RH and LH. Also shown on Fig. 1 there are two entry receiving devices for the multiplier and multiplicand respectively designated MP and MC. On Fig. 1 there is also shown a control box generally designated CN which contains the usual automatic control magnets, automatic control contacts, group indicating magnet and group indicating contacts. The mechanism in this control box is generally of the type shown in the United States patent to Lake, No. 1,600,413, dated September 21, 1926 (see Figs. 11 to 18 incl. of that patent). Another control box which is generally of the same construction is that shown in United States patent to Lake No. 1,822,594, dated September 8, 1931 (see Figs. 24 to 27 inclusive of that patent).

The machine also includes a number of multi-contact electromagnetic relays. These relays according to the embodiment disclosed are of the purely electrical type and may be of the general form shown in United States patent to Daly, No. 1,839,377, dated January 5, 1932. Multi-contact relays of the same general form are also shown in British Patent No. 358,105.

The machine includes a number of emitter mechanisms, commutator timers, impulse distributor and cam contact devices which will be subsequently described.

*Machine drive*

The machine is adapted to be driven by a constantly running motor M (Fig. 1). This motor, through a belt and pulley and ratchet drive, drives a shaft 51 which shaft drives an A. C.—D. C. generator 52. The A. C. end of this generator is adapted to produce the alternating current impulses for actuating the various accumulator and relay magnets and the generator 52 also has a D. C. (direct current) takeoff section. Shaft 51 through worm gear drive 53 drives a vertical shaft 54, which shaft drives the units shown on the upper part of Fig. 1. The drive to the units in the upper section will be first described.

Shaft 54 at its upper end, through worm gearing 55, drives a main drive shaft 56 of the machine. The various accumulators or receiving devices in the upper section of the machine are driven from this main drive shaft in the customary manner. The reset drive for the various accumulator units is provided for in the following manner. Shaft 56 is provided with a spur gear 57 driving a gear 58 with a four to one drive ratio. Gear 58 has extending from it four Geneva pins cooperating with the cross element of the geneva designated 60. Secured to the element 60 is an internal gear 61 which gear has cooperating with it a spur gear 62 mounted on the end of the reset shaft 63. Resetting is effected through one revolution reset clutches controlled by reset magnets.

*Card feed, card handling and reading and card punching unit drive*

Referring to Figs. 1a and 2 the shaft 56 near its right hand end is provided with a gear 68 which drives a gear 69 freely rotatable upon a shaft 70, and having fast to it the notched element 71 of a one revolution clutch. The complemental part of this one revolution clutch comprises a pawl 72 carried by an arm 73 which is fixed to shaft 70. This one revolution clutch is of the customary type used in tabulating machines and the clutch is engaged by the energization of the clutch magnet 67. A clutch of this sort is shown in Lake Patent No. 1,822,594, see Figs. 1 and 1a. With the clutch engaged, shaft 70 will rotate in unison with gears 68 and 69 and in unison with the counter drive shaft 56. With the clutch disengaged, shaft 70 will be stationary, while shaft 56 will continue its rotational movement. Shaft 70 through spiral gearing generally designated 74, drives the lower of a series of pairs of card feed rolls designated 75, 75a and 75b. The shaft 70 also drives contact rolls 76 and 77 (see Fig. 2) by gearing extending from certain of the rolls 75 (see Fig. 1a). Cooperating with the lower feed rolls 75 are upper feed rolls 78 which are preferably gear driven in unison with the lower feed rolls. An upper roll 78a is provided which roll is frictionally driven. A roll 78b is provided, which roll may be positively driven in unison with the cooperating lower roll 75b. Preferably the rolls 75a and 78a may be arranged to rotate at a slightly higher rate of speed than rolls 75 and 78 or to have a slightly higher peripheral speed in order to insure the card properly contacting with the card stop, which card stop will be subsequently described.

The machine is provided with a card supply magazine 79 and a discharge hopper 80. A picker 81 of conventional construction and crank operated is driven in any suitable manner by the driving shaft 70 as by the driving train 82 shown in Fig. 1a.

The machine is provided with advance sensing brushes 83 and a second set of sensing brushes 84, which respectively cooperate with the contact rolls 76 and 77. As stated before the contact rolls 76 and 77 are driven from the shaft 70 (see Fig. 1a) and preferably the drive is such that these contact rolls slip slightly relatively to the card to cause a slight slipping or creeping action of the contact rolls. The usual card lever contacts 89 and 90 are provided which are adapted to be closed upon the passage of cards thereunder and to open up upon the failure of a card to cooperate with the respective card levers. A card leaving the right hand pair of rolls 78 and 75 enters a punching die comprising upper and lower die plates 92 and 93. Sets of rows of punches 94 are provided suitably supported for sliding movement in a punch operating frame generally designated 95. A series of interposer selector bars 96 are provided, one interposer selector being provided for each row of punches and each selected bar carries on its end a punch operating plunger 97, which plunger slides over the tops of punches 94 and below the top of the punch operating frame 95.

Drive for the punching section of the machine is as follows. Referring again to Figs. 1 and 1a, the shaft 56 is provided with a gear 98 which in turn drives a gear 99 freely rotatable on a punch operating drive shaft 100. Gear 99 has fast to it the notched element 101 of a one revolution clutch and the complemental part of this clutch comprises a pawl 102 carried by an arm 103 which is fixed to the shaft 100. This one revolution clutch is of the usual electromagnetically controlled type and when engaged by the energization of the punch clutch magnet 64, shaft 100 is turned through one complete revolution upon three complete revolutions of the main drive shaft 56. In view of the three to one driving ratio the notched element 101 is provided with three notches to receive the pawl 102 in either of three positions. Shaft 100 near its right hand end, through spiral gearing generally designated 104 (see also Fig. 1a) drives cams upon a stub shaft 105. The gearing drives an interposer cam 106 (see Fig. 1a) and a punch operating cam 107. The interposer cam 106 is adapted to shift a crank follower 108 fixed to a rock shaft 108a and through arms 108b shifts a cross-bail 109 back and forth on slide rods 110 (Fig. 2). The interposers 96 are impositively driven from the crossmember 109 in any suitable manner as by spring pressed pawls 111. The interposers are selectively positioned over the punches by means of pawls 112 which engage ratchet teeth in the top of the interposer bars in the usual manner. Pawls 112 are electromagnetically tripped by punch selector magnets 113. After a given interposer bar or bars have been selectively positioned under the control of the punch selector magnets the punches which are under the ends of the punch operating plungers 97 will be positively forced through the card by the punch operating cam 107 (Fig. 1a), which cam through its follower rocks a rock shaft 114 which in turn, through arms and linkage 115 is adapted to operate a suitable operating means for the punch frame 95, such operating means being here shown as a toggle 116 (Fig. 1a).

It will be understood that cards will be picked from the magazine 79 (Fig. 2) and in one machine cycle the cards will be passed to a position in which the leading card is about to be read by the set of brushes 83. The card on the next machine cycle will pass to the next reading station adjacent brushes 84 and on the following machine cycle it will pass into the punching die. The card is arrested in the punching die by a card stop 117 which card stop cooperates with the pivoted arm 118, coacting with a cam 119 disposed on shaft 70 (see Fig. 1a). With the card stop 117 elevated, the card will be arrested in proper position in the punching die. The feed rolls 75a and 78a urge the card into cooperation with the card stop and after the card has been intercepted by the card stop, slip relatively thereto before their rotational movement terminates. Upon withdrawal of the card stop after punching the card will be ejected from the punching die by the rolls 75a and 78a and delivered to the discharge stack by rolls 75b and 78b.

It will be understood that a card is removed from the die plates 92 and 93 during a card feed cycle, in which a new card is being introduced into the die and being sensed and the one revolution card feed clutch permits a card to be advanced through one station and then arrested for an indefinite number of cycles and the one revolution punch clutch permits the punch to be called into operation after the requisite number of computing cycles. Upon the completion of punching, a new card feeding and reading cycle may ensue.

Emitters and cam contacts

The main drive shaft 56 is adapted to drive the cams of certain C cam contact devices, such cams being correspondingly designated on Fig. 1 as CA, CC, CD, CE and CG. The main drive shaft 56 is also adapted to drive certain commutator timers which are designated CX—1 to CX—8. These commutators have their spots so arranged as to make their respective circuits concurrently. Also driven from the main drive shaft 56 is another set of commutator timers designated CC—1 to CC—8 respectively. The relative location of the spots of these commutator timers is such that they make their respective circuits sequentially. CC—8 makes first, followed by CC—7 and so on.

Upon the shaft 70 (see Fig. 1a) there are provided cams of a number of FC cam contacts. Such cams are correspondingly designated as FC—1 to 8 inclusive on Fig. 1a. The punch operating drive shaft 100 also drives the cams of a PM group of cam contacts. Such cams are correspondingly designated on Fig. 1a as PMB, PMC, PMF, PMG, PMH, PMK, PML, PMN, PMR and PMS.

The machine is also provided with three emitters which are of conventional construction and which are driven from the main drive shaft 56 (See Fig. 1). Such emitters are designated 120, 121 and 122. An impulse distributor 123 is also provided driven in unison with the cams of cam contacts CA, etc.

Reset control contacts and GI contact control

The reset gear of the MP accumulator is provided with a cam adapted upon the reset of the accumulator to open contacts 124. The reset gear of this MP accumulator also carries an eccentric 125 adapted to shift a linkage 126 which extends to the control box CN. Such linkage corresponds to the linkage shown in Lake Patent No. 1,822,594 and designated 402, 403 and 404 in Fig. 5 of that patent. The control box is driven by gearing 127 which corresponds to the gearing 396, 397, 398, etc. of the Lake patent.

Control box

The control box CN will not be further illustrated or described. It is sufficient to here state that it contains the auto-control magnets similar to magnets 72 (Fig. 24 of the Lake patent), the auto-control series contacts similar to 73, the auto-control breaker contacts similar to 71 and the group indicator contacts similar to 77 and the extra group indicator contacts similar to GI—9 and GI—10. The control box also contains the usual group indicator magnet which is designated 92 in the Lake patent. The mechanical structure of the control box of the Lake patent is otherwise the same except that the control box does not contain the C cam contacts which are disposed elsewhere in the present machine.

The foregoing description has described the manner in which cards are drawn in succession from the supply magazine and the manner in which the cards carried past the various sensing brushes and delivered into the punching section of the machine. With the traverse of each card past the sensing brushes 84, the various amounts are read from the card and entered into the receiving devices of the machine. In the present invention the advance reading brushes 83 are used with brushes 84 for control purposes.

The receiving device and accumulators are of the usual type as customarily used in tabulating machines and are provided with electromagnetically actuated clutches. The various accumulators and receiving devices have commutator type readout devices which will now be described.

MP Readout

Figure 3:
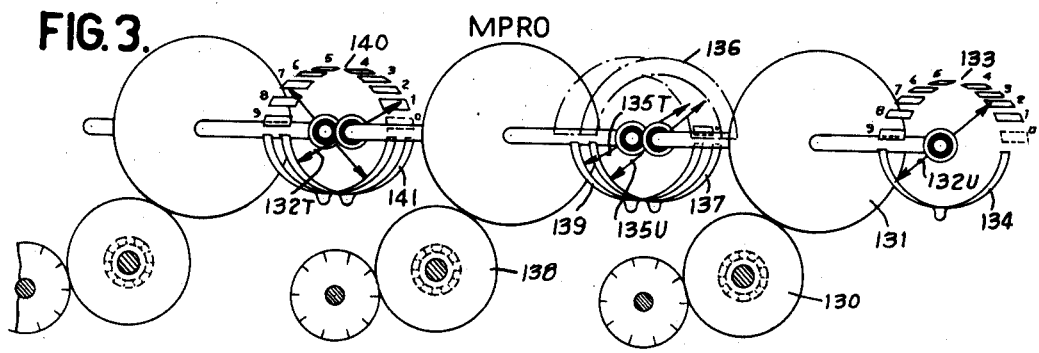
Fig. 3 shows somewhat diagrammatically the arrangement of the MPRO (multiplier) readout device.
Figure 4:
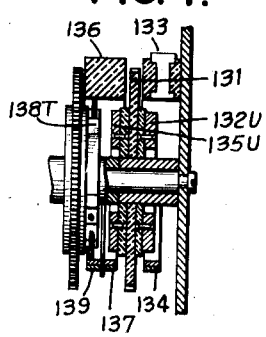
Fig. 4 is a fragmentary sectional view of the MPRO readout device.

Referring now to Figs. 3 and 4, 130 is a clutch gear pertaining to the units order of the MP (multiplier) receiving device. Gear 131 is driven from this clutch gear and this gear in turn drives two brush assemblages, one designated 132U, which traverses a set of segments 133 and also a current supply segment 134. There is another brush assemblage 135U driven by gear 131 which brush traverses a segment generally designated 136 and which segment is provided with a single conducting spot at the zero position. The brush 135U also traverses a common supply segment 137. There is a similar brush 135T which is positioned from the tens order clutch wheel 138 and which also traverses the segment 136 which contains only the single conducting spot at the zero position. Brush 135T also traverses a separate common current supply segment 139. Similarly there is a brush 132T driven in unison with brush 135T which traverses the segment spots 140 and which receives current from the common current supply segment 141. This arrangement of brushes and segments is repeated for higher orders in the MP readout device, i. e. each alternate segment is like 136 with only a single spot in the zero position on each segment. Alternating with these segments are other segments similar to 133 and 140 with a multiplicity of spots on each segment. The detail construction of this readout with its brush assemblages is shown in the cross-sectional view Fig. 4. The wiring of the readout will be more fully set forth in connection with the circuit diagram (see Fig. 9a).

MC Readout

Figure 5:
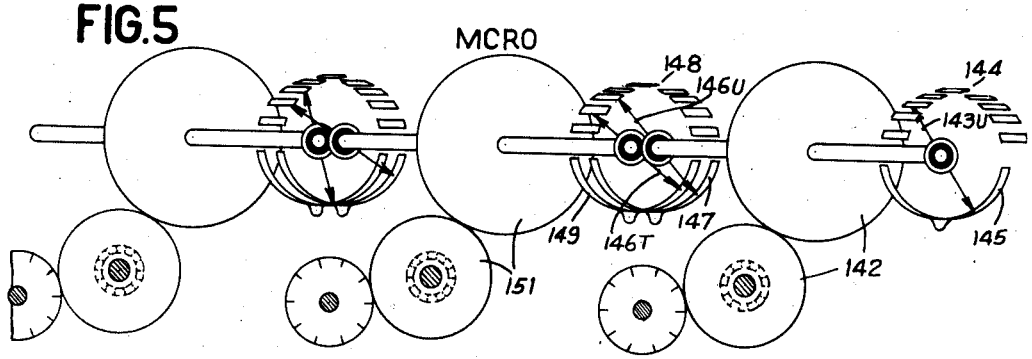
Fig. 5 shows somewhat diagrammatically the arrangement of the MCRO (multiplicand) readout device and the driving train therefor.
Figure 6:
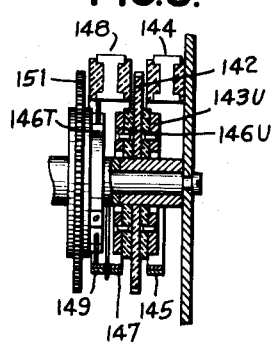
Fig. 6 is a fragmentary sectional view of the MCRO readout device.

Referring now to Figs. 5 and 6, in Fig. 5 is shown the brush driving arrangement for the MC readout. In this embodiment the units clutch gear train 142 drives a units brush assemblage 143U which cooperates with a set of segments 144 which receive current from a common conductor segment 145. Similarly, units driving train 142 drives a brush assemblage 146U receiving current from a conductor segment 147 and cooperating with segments 148. Also cooperating with segments 148 is another brush assemblage 146T receiving current from a conductor segment 149, which brush assemblage cooperates with the segments 148 and which brush is driven by the tens order clutch train 151. This arrangement is repeated for relatively higher orders.

RH and LH Readouts

Figure 7:
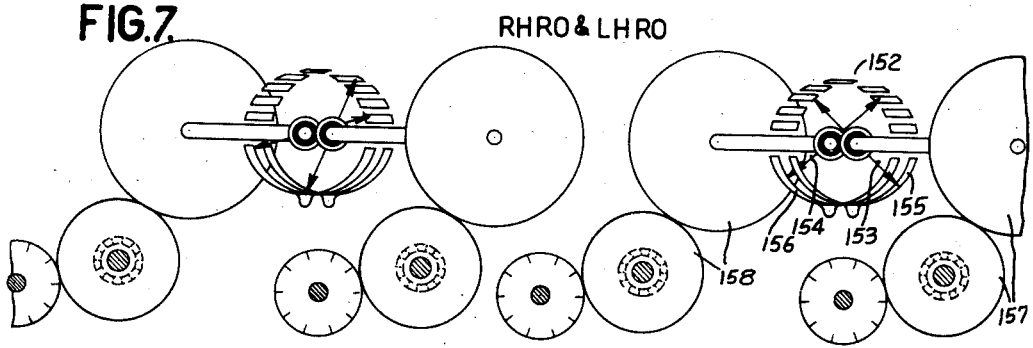
Fig. 7 shows somewhat diagrammatically the arrangement of the RHRO (right hand partial product) readout device and the LHRO (left hand partial product) readout device and the driving train therefor.

Fig. 7 shows the general arrangement for the readouts for the RH accumulator and the LH accumulator. With a readout mechanism of this sort, it will be noted that the segment spots 152 are common to two sets of brush assemblages designated 153 and 154 respectively and which brushes cooperate respectively with conducting segments 155 and 156. Brush 153 as shown in Fig. 7 is driven from the units order clutch gear train 157. Brush 154 on the other hand is driven from the tens order clutch train 158 by the gearing diagrammatically illustrated. On the RH readout the segment spots 152 are nine in number, whereas on the LH readout ten of such segment spots 152 are provided.

Figure 8:
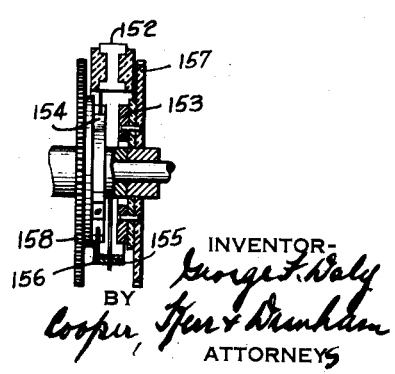
Fig. 8 is a fragmentary sectional view of one of these readout devices.

A similar arrangement of brushes and readout spots is provided for the relatively higher orders of these accumulators and the wiring of these readouts is shown on the circuit diagram (see Figs. 9d and 9e). Fig. 8 shows the details of construction.

Card arrangement

Before describing the circuit diagram of the machine it may be explained that in card runs in the present machine the cards are punched and arranged in groups in the following manner. The first card of a group is punched with the amount of the multiplier and with a control number. The following detail cards of each group are punched each with a multiplicand and with a control number, the control number corresponding with the control number on the leading multiplier card. The following cards of another group are preceded by a leading multiplier card containing a multiplier amount and a control number which leading card is followed by one or more detail cards containing each a multiplicand amount and a control number which control number matches with the control number upon the leading multiplier card of the group. While the detail cards may have multiplier amounts thereon the arrangement of the machine is such that such multiplier amounts on detail cards are disregarded.

Plugging

Before placing the machine in operation, plugging is effected in the following manner. Plug connections are made from plug sockets 180 (Fig. 9a), which are wired to the advance brushes 83, to plug sockets 181 which are wired through the auto-control breaker contacts 182 to the auto-control magnets 183. From the plug sockets 184, plug connections are made back to plug sockets 185 which are wired to the lower brushes 84 pertaining to the control number field of the card. Such brushes on the diagram will be designated 84CN. From the brushes 84MP, which pertain to the multiplier field of the card, plug connections are made from sockets 185MP to plug sockets 186 which are individually wired to the GI contacts GI—1 to 8. The opposite side of these contacts extend to sockets 187 of a plug board and from these plug sockets plug connections are made to sockets 188 which in turn are wired to the 189MP accumulator magnets. From the lower brushes 84 pertaining to the multiplicand field, designated 84MC, plug connections are made from plug sockets 185MC to plug sockets 190 which are wired to the 189 MC accumulator magnets. At plug board 191 (Fig. 9d) suitable plug connections are made to provide the proper entry circuits to the RH accumulator magnets 189RH, and at plug board 192 (Fig. 9e) plug connections are made to provide for the proper entry circuits to the LH accumulator magnets 189LH. Also on Fig. 9e at plug board 193, proper plug connections are made to provide for the entry circuits to the punch selector magnets 113.

Circuit diagram

The main line switch 195 (Fig. 9a) is first closed providing a source of current supply for the main driving motor M. With the motor M in operation the A. C.—D. C. generator 52 is set in operation, the D. C. end of this generator supplying direct current to D. C. buses 200 and 201. The A. C. end of the generator supplies alternating current impulses to bus 202 and to ground in the customary manner. With punched cards arranged in groups and placed in the supply magazine of the machine, the operator depresses the start key 203 (Fig. 9e) and upon closure of cam contacts CA a circuit is completed through the start key contacts 203, through the card lever relay contacts CL—1 now in the position shown.

to the card feed clutch magnet 67 and to the other side of the D. C. line 201. The start key is held depressed for more than one counter cycle and the machine is kept in operation so that the leading card is advanced to a point at which it is about to be read by the brushes 84. In passing to this position card lever contacts 89 and 90 (Fig. 2) become closed. Card lever contacts 89 (Fig. 9a) complete the return circuit from contact roll 76 to ground but the circuit is incomplete until a card is under the lower brushes 84. Card lever contacts 90 (Fig. 9e) when closed, complete a circuit to card lever relay coil CL and the energization of this relay coil shifts relay contacts CL—1 to CL—6 to the reverse position from that shown in the circuit diagram. The shifting of card lever relay contacts CL—1 occurs approximately at the beginning of the third card feed cycle but the card feed clutch 67 will have received a current impulse late in the second card feed cycle by holding the start key down by hand which will provide for card feed during the third machine cycle. During the third machine cycle the leading multiplier card is passing under the reading brushes 84 and the following detail card is passing under the advance brushes 83. With the passage of these two cards the automatic control unit functions in the usual manner as fully described in Lake Patent No. 1,822,594. It is sufficient to here state that since the control perforations agree the series control contacts 205 (Fig. 9a) become closed during the reading of the control perforations of the cards by both sets of brushes. Before the leading multiplier card and the first following detail card is read a circuit will be established from the 200 side of the line, through the contacts GI—10 (Fig. 9a) to auto-control relay 206 and through relay coil PR to the other side of the D. C. line 201. Upon energization of relay coil 206 a stick circuit is established through cam contacts FC—2. With cards comparing and the series contacts 205 closed the stick circuit will be maintained through the 205 contacts at the time the FC—2 cam contacts open. At the proper time in the cycle as shown in the timing diagram cam contacts FC—3 close to energize the GI magnet designated GI. The energization of GI effects the opening of the GI—1 to 8 contacts and the GI—10 contact (Fig. 9a) and also effects the opening of the GI—9 contact (Fig. 9e). As in the Lake patent the opening of contacts GI—1 to 8 suppresses further entries into the MP accumulator after the first entry is made thereinto, and no further entries are made into this MP accumulator until it is reset. At each card cycle the series contacts 205 are mechanically restored to open position following the reclosure of FC—2. With the passage of the leading multiplier card past the lower brushes the amount of the multiplier will be entered into the multiplier counter.

Cycle controller

The cycle controller which is used in the present machine is substantially the same as the cycle controller shown in British Patent No. 358,105 (see Figs. 23 and 20c of that patent). The cycle controller of the British patent is for the purpose of eliminating unnecessary computing cycles where zeros appear in the multiplier and this control is brought about by setting up the cycle controller for all orders of the multiplier, then ascertaining the column in which zeros appear holding the setup for such related columns and breaking down the setup for the columns of the multiplier where significant figures appear. The cycle controller with attendant multiplier relay selection then controls column shift action successively, but only for the columns of the multiplier in which the setup is broken down and multiplying cycles occur in automatic succession. The present cycle controller and column shift and multiplier relay selection and control, together with the emission of multiplying impulses are substantially the same as in the British patent, but the cycle controller is modified in a slightly different manner. These slight differences will be first described. The relay coil N (Fig. 20b of the British patent) and Fig. 9a of the present application, in place of having the single control by contacts PMN is provided with a supplemental control through cam contacts FC—4 and card lever relay contacts CL—7. In place of having the return circuit from this relay coil go direct to ground, the return circuit is via wire 207 back to the 201 side of the D. C. line. All circuits of the cycle controller of the British patent shown as returning to ground 276 (in the British patent) are in the present embodiment, extended back to the opposite or 201 side of the D. C. line. Line 274 of the British patent corresponds to line 200 of the instant application. An additional relay control including relay contacts NM—1 is provided intermediate the cross line extending to cam contacts CD (see Fig. 9b.) In lieu of controlling the cycle controller from commutators such as shown at 432 in Fig. 32 of the British patent which commutators were associated with the adding wheels of the multiplier receiving device, wires 208 (Figs. 9a and 9b) have been provided leading to the 440 contacts of the cycle controller and extending to the zero spots of the MPRO readout. It may be explained that if a brush of the MP readout stands on a zero spot that the action is just the same as if a corresponding commutator 432 of the British patent was in such position to close the circuit at the commutator. The return line from the zero spots of the MPRO readout to the opposite side of the D. C. line is provided at 209 (Fig. 9a). In addition to the cam contacts PMK shown in Fig. 28c of the British patent and in Fig. 9b of the present application, additional cam contacts FC—5 is also provided in the same line. The purpose of the additional cam contacts FC—5 is to prevent initiation of cycle controller action during either card feeding or punching. In the British patent the single cam contacts PMK were provided for this purpose since card feed was always coordinated with punching, but in the present machine with a separate punch clutch control and card feed clutch control two separate cam contacts must be provided, one on the punching end of the machine and one on the card feed end of the machine. The operation of the cycle controller will be subsequently described in further detail.

Eliminating of punching and multiplying operations on multiplier card and eliminating of "dummy" multiplying operations With the present machine provision is made for both eliminating punching on the leading multiplier card and for also suppressing dummy multiplying operations which occurred with previous multiplying machines when handling rate or leading multiplier cards.

It may be explained that heretofore in these record controlled multiplying accounting machines, that in handling certain records, for example rate cards which contained a multiplier amount only and no multiplicand, that the machine upon handling such a card went through a series of operations called "dummy multiplying operations" in which the machine attempted to multiply a lacking multiplicand amount (i. e. a series of zeros) by the entered multiplier amount. Since the product of a series of zeros multiplied by real numbers or zeros is zero no partial products were actually produced, but nevertheless the operating time of the machine was consumed and additional operating time was consumed for an idle RH to LH transfer and in some cases further operating time was involved in a resetting operation for setting up the cycle controller. With the present machine provision is made for eliminating such idle machine operations and for thereby speeding up the operating time of the machine. The elimination of dummy multiplying operations is provided for in the following manner.

As previously explained, contacts GI—9 (Fig. 9e) remain closed during the sensing of the leading multiplier card, but immediately thereafter open up and remain open until the multiplier receiving device is reset at a time when a new multiplier is to be entered into the machine. With contacts GI—9 closed, upon closure of cam contacts FC—7, a circuit is established from line 200, through switch 213 now closed, through FC—7, contacts GI—9 now closed, card lever relay contacts CL—6 now closed, through relay coil RA, relay coil NM, relay coil PE, relay coil RC to the other side of the D. C. line. A stick circuit is established for these relay coils, through relay contacts RA—I and cam contacts PMS now closed. The energization of relay coil NM (Fig. 9e) causes closure of relay contacts NM—I (Fig. 9b) so that immediately following the passage of the leading multiplier card past the brushes 84 the closure of relay contacts NM—I will, upon closure of cam contacts CD, cause energization of relay magnet PS which corresponds to relay magnet 350 of the British patent above mentioned.

The effect of the energization of relay coil PS is to close relay contacts PS—I (Fig. 9e) and upon closure of cam contacts CG there is an immediate energization of the punch clutch magnet 64. With this punch clutch magnet energized, a cycle of operation of the punching mechanism ensues directly following the feed of the first leading card and without intermediate dummy multiplying operations.

It may be explained that to prevent an unwanted set up of the cycle controller and an undesired energization of the multiplier relay magnets on the cycle in which the leading multiplier card is passing the brushes that relay contacts RC—I (Fig. 9b) are disposed in the supply circuit to cam contacts PMK and FC—5 and that the relay coil RC which controls these contacts is placed in circuit with relay coils RA, NM and PE. Such relays RA, NM and PE are energized only during the passage of the leading multiplying card and with relay RC energized the circuit to the relay contacts G—I of the cycle controller will be completely cut off.

Notwithstanding that the punching mechanism is in operation, punching operations are suppressed by the opening of relay contacts PE—I (Fig. 9e) which is brought about by the energization of relay coil PE in the manner previously described. With relay contacts PE—I open, the supply circuit to the punching emitter 122 is cut off so that there is no energization of the punch selector magnets 113, through the LHRO readout. Accordingly, the punch interposers pass beyond the zero position of the punches to a blank position and although the punch operating frame is actuated no punching is effected upon the card in the punching dies. It may be explained that the reason for effecting this cycle of operation of the punching mechanism is to effect certain resetting operations under these operating conditions.

It may be explained that further operations of the machine are initiated by this operation of the punching mechanism. With this preliminary operation of the punching mechanism it is desired to reset the LH accumulator, the RH accumulator and the MC accumulator. The MP accumulator, however, should not be reset at this time because the MP amount which had been previously entered into this accumulator should be retained therein for control of further multiplying computations upon following detail cards.

Referring to Fig. 9a, during the sensing of the leading multiplier card and the following detail card, relay coil PR is maintained energized since the control numbers compare. The effect of the energization of relay coil PR is to hold relay contacts PR—I (see Fig. 9e) in open position. Accordingly, the circuit to the 210MP reset magnet (see also Fig. 1) is interrupted at the time of closure of cam contacts PMB. Accordingly, the MP accumulator is not reset at this time. The closure of PMB, however, effects the reset of the MC accumulator by supplying current to the 210MC reset magnet. The closure of cam contacts PMC later in the cycle, effects energization of the 210RH and the 210LH reset magnets to bring about a reset of these accumulators. The machine is now ready to initiate another card feeding cycle and to read the multiplicand amount from the next following detail card.

Referring to Fig. 9e, closure of cam contacts PMF will re-energize the feed clutch magnet 67 provided cards are in the machine and under the card lever 90 so as to cause closure of card lever relay contacts CL—2. The circuit is from the 200 side of the D. C. line, through PMF, through CL—2, to the card feed clutch magnet 67 and to the other side of the line. Another card feed cycle now ensues and during this card feed cycle the leading multiplier card which was previously in the die will be fed to the discharge stack and the first detail card will be passed by the sensing brushes 84 and to the punching die and the second detail card will pass the advance brushes 83. With the assumption that the control number on the second detail card matches with the control number on the preceding detail card the following operations will ensue. Relays 206 and PR will be energized (Fig. 9a). The effect of the energization of these relays is the same as before, that is they apprise the machine that there has been no change of control number and that no reset of the MP accumulator should be effected, reset being suppressed by the opening of relay contacts PR—I (Fig. 9e). It will be recalled, however, that during the passage of the first detail card, the GI—9 contacts will be open, having been previously opened during the passage of the first leading multiplier card. Accordingly, under this condition of operation no pick-up circuit will be established to relay coils RA, NM, PE and RC (Fig. 9e). With relay coil NM remaining de-energized, the relay contacts NM—I (Fig. 9b)

will not close and accordingly the PS relay coil will not be energized directly upon closure of cam contacts CD as in the previously described control.

In lieu of the eliminating of multiplying cycles, a series of multiplying cycles will now ensue under the control of the cycle controller. The operation of the cycle controller need not be traced in full detail as the same is fully set forth in the above mentioned British Patent No. 358,105. It may be explained, however, that with the punching mechanism at rest and with the card feed stopped, that a circuit will be established from the left side of the line 200 through relay contacts RC—1, cam contacts PMK, FC—5 to the relay contacts G—1 (Fig. 9b) and current will be allowed to flow into the cycle controller. With cards passing through the machine relay coil G is energized to close relay contacts G—1 upon the passage of the leading first card past the reading brushes 84. The circuit is as follows. Through cam contacts CA (Fig. 9e), start key contacts 203, card lever relay contacts CL—1 in shifted position, through relay coil RB, relay coil G to the other side of the line 201. The relay coil G will be maintained energized so long as cards pass, by the holding circuit through relay contacts RB—1, the stop key contacts 211a, card lever relay contacts CL—3 to the other side of the line or through an alternative path via cam contacts PML.

It may be explained that during the preceding idle punching cycle and in fact on any punching cycle, cam contacts PMN (Fig. 9a) will close to energize relay coil N. The energization of relay coil N will act in a manner described in the British patent to close all of the relay contacts N—2, N—3, etc. With these contacts closed momentarily, circuits will be established to energize relay coils T—1, T—2, etc. and relay coils U. Stick circuits will be established through the relays T through a line 212 to the 200 side of the D. C. line. After the pick-up of the N relay and the pick-up of the T and U relays, cam contacts PMR (Fig. 9e) close to establish a circuit through the multiplier reset contacts 124, to a relay magnet 446. This corresponds to a similarly numbered magnet in the British patent, above referred to. The energization of 446, which will be effected only if the multiplier receiving device is not being reset, will effect the shift of the relay contacts 442, 438, 440 to the reverse position from that shown, that is, 438 will move to break contact with 442 and make with 440 and the action is such that 438 makes with 440 before it breaks with 442. This action places the control of the de-energization of relay coils T and U under the control of the zero spots of the MPRO readout. If a significant figure appears in any order of the multiplier, its corresponding T and U relays will be de-energized, but if a zero is present, such relay coil will be maintained energized. At the end of the card feed cycle when the first detail card of the group is passing the reading brushes 84 the commutator timers CX—1 to CX—8 will close concurrently, such closure occurring shortly after the closure of cam contact FC—5. Multiplying will then be initiated during the following cycle, the column shift control under the control of the cycle controller being the same as in the British patent. The usual multiplying cycles will ensue. The product representing impulses will be emitted by the multiplier emitter 120 through the selected multiplier relays. The relay coils of such multiplier relays are selectively energized under the control of the MPRO readout and under the control of CS—1, CS—2, CS—3, etc. as successive multiplying cycles ensue. This action is fully described in the British patent.

It may be explained that the contacts S—1, S—2, etc. have the function of corresponding contacts in the British patent. Such contacts are retained in the present arrangement for operations in the machine where no auto-control is involved. When the machine is operated without auto-control, the set up of the cycle controller is effected by the S—1 to S—8 contacts in the manner described in the British patent. When the machine is operating with auto-control, the cycle controller set up is under the control of the zero spots of the MPRO readout. With the cycle controller set up in this latter manner, the 438 contacts (Fig. 9b) will be momentarily shifted from the left from the position shown to make contact with the 440 contacts before contact with the 442 contacts is broken and to thereafter cut off the circuits from the S—1 to the S—8 contacts. With the parts so set, the set up of the cycle controller is obtained directly from the zero spots of the MPRO readout. Subsequently the contacts 438 return to the position shown and holding circuits for certain of the relays of the cycle controller are completed through certain of the S—1 to S—8 contacts. When auto-control is not desired, the auto-control brush circuits are left unplugged and a switch 213 (Fig. 9e) is thrown to open position and switch 214 (Fig. 9a) is thrown to open position. With the auto-control feature suppressed and not used the operation is substantially the same as in the British patent.

Selected impulses flow through MCRO readout and flow via lines 220RH and 220LH and through the multi-contacts of the column shift relays to the RH counter magnets 189RH and to the LH counter magnets 189LH. When multiplication is complete the cycle controller control brings about energization of the PS relay coil (Fig. 9b). Energization of PS initiates a cycle of operation of the punching section of the machine, the punch clutch being energized (see Fig. 9e) through cam contacts CG, relay contacts PS—1 to punch clutch magnet 64. During this cycle of operation of the punching section of the machine and at the proper time in the cycle cam contacts PMH (Fig. 9e) close to energize relay magnet CR and the energization of this magnet shifts relay contacts CR—1 to 16 (Fig. 9d) to reverse position. This establishes reading out circuits intermediate the RHRO readout and the 189LH accumulator magnets. The 121 RH to LH emitter emits impulses through the RHRO readout which flow through the respective CR—1 to 16 contacts to the transfer lines 221LH and via plug connections at plug board 192 to the 189LH accumulator magnets. The complete product is now set up in the LH accumulator. Later in the cycle of operation of the punching section of the machine, cam contacts PMG (Fig. 9e) close and current supply is afforded to the emitter 122 through relay contacts PE—1 now closed. The emitter 122 emits impulses to the LHRO readout and through the plug connections at plug board 193 to the punch selector magnets 113 and the proper punches are selected for punching in the manner previously described. After the punches have been selected for punching, further operation of the punching section of the machine and the operation of the punch actuating frame depresses the punches through the card to punch the product on the first detail card.

Following the punching of a detail card there is a resumption of card feed and the operations proceed on each detail card until the control number changes. Change in control numbers will be detected when a leading multiplying card passes the upper brushes and while the preceding detail card is passing the lower brushes. Upon such change in control number calculating and punching operations proceed on the last detail card, but the change in control number will modify the operations of the machine in the following manner. With a failure of control, the relay coil PR (Fig. 9a) will not remain energized upon opening of cam contacts FC—2. Accordingly, with relay coil PR de-energized relay contacts PR—1 (Fig. 9e) will close and accordingly upon closure of cam contacts PMB, the MP receiving device will be reset at the time the MC receiving device is reset. This will remove from the MP counter the multiplier which had previously been placed in it and which remained in it for the preceding group of detail card calculations. Upon the reset of the MP receiving device, the GI contacts, GI—1 to 8, GI—9 and GI—10 will be mechanically restored to closed position. The closure of GI—10 re-energizes relay coil PR and relay coil 206. The mechanical re-closure of contacts GI—1 to 8 will re-establish the entry circuits for the multiplier so that the new multiplier from the new leading card with a changed control number will, upon the following card feed cycle, be entered into the MP receiving device. During the reset of the MP receiving device (see Fig. 9e) contacts 124 will be open and magnet 446 will accordingly not become energized upon closure of cam contacts PMR. It may be explained that it is not desirable to shift the 442, 438 and 440 contacts (Fig. 9b) if the MP receiving device is being reset, because such shift is desired after the multiplier has been entered. With a new multiplier amount in the machine the machine proceeds with its series of calculations in the manner previously described.

When the machine is punching the last card of a run and no further cards are available for further computations there will be no resumption of card feed since card lever relay contacts CL—2 will be open at the time cam contacts PMF (Fig. 9e) close. Under last card operations when the last card is under the 84 brushes and no card is under the 83 brushes it is desirable to prevent control operations and this is effected by card lever contacts 89 which open up when there is no card under their corresponding card lever. With contacts 89 opened up, the automatic control circuits function just as if a break in control occurs so that the multiplier counter will be automatically reset before the machine finally stops.

Summarizing the operations, the machine on a run of cards which includes a leading multiplier card with a control number followed by a group of detail cards with the same control number, followed by a multiplier card with another control number, followed by another group of detail cards with the same control number, functions generally in the following manner. The multiplier amount is derived from the leading or multiplier master card. Further entries into the multiplier entry devices are suppressed for the detail cards of the group. Upon a change in the control number the multiplier receiving device is automatically reset and the entry circuits are re-established automatically so that a new multiplier may be entered into the multiplier counter from the new multiplier card. Upon multiplier cards passing through the machine dummy multiplying operations are automatically suppressed but a punching cycle is permitted which, however, is ineffective so far as punching on the multiplier card is concerned. The machine merely goes through an idle cycle of operations of the punching section of the machine with the attendant reset and automatic preparation of the cycle controller for a new operation on the following card.

It may be explained that the card feed clutch magnet 67 (see Fig. 9e) has stick contacts 235 associated therewith adapted to close upon the attraction of the clutch magnet armature to establish a stick circuit for the clutch magnet through the FC—6 contacts. Such contacts are operated in a similar manner to similarly numbered contacts in United States patent to Lake, No. 1,822,594.

In order to properly control the machine when it has been stopped under emergency stop conditions with cards still in the machine certain supplemental control circuits are provided which will now be described.

If during a run of cards it is desired to stop the machine, the stop key is depressed, opening contacts 211a and de-energizing relay coils RB and G. The de-energization of G opens relay contacts G—1 (Fig. 9b) and prevents a set up of the cycle controller following a feed of the succeeding card. Accordingly, multiplying and punching operations are suppressed and further machine operations stopped until the start key is again depressed to close the start key contacts 203 (Fig. 9e) and cause resumption of operations in the usual way.

The auto control is provided with the usual plug sockets 237 to receive in any desired column the customary short circuiting plug 236 to shunt out unwanted control columns.

The timing diagram shown in Figs. 10 and 10a may be briefly referred to. This timing diagram shows the operating conditions of the machine with the machine functioning on a card run. On Fig. 10 the left hand machine cycle represents the cycle of operations which occur during card feed. The following two cycles delineated on Fig. 10 are two multiplying cycles. It will be understood that there may be an indefinite number of such multiplying cycles depending upon the number of significant figure places in the multiplier. Following these cycles there are three machine cycles shown on Fig. 10a which delineate the machine cycles which elapse during the operation of the punching section of the machine. Following the completion of the punching operation on Fig. 10a, the machine automatically resumes operation with the left hand cycle delineated on Fig. 10. If a break in control occurs the machine proceeds with the multiplying cycles which pertained to the previously read detail card and punches the detail card during the punching cycles delineated. The feed is then restarted and on the following card feed a new multiplier amount is entered. Following the reading of such new multiplier amount, however, the machine omits all multiplying cycles and proceeds directly to perform idle punching cycles and following this it again resumes card feed.

In further explanation of the timing of the operations of the machine, particularly when a change of control occurs the following explanation is given. It will be assumed that the last detail card of a previous group is about to be read by brushes 84 and that a new multiplier card bearing a new group number is now to be read by the brushes 83. Upon the feed of both cards past their respective brushes, the multiplicand from the detail card will be read into the MC accumulator under the control of brushes 84. During the same card feed, however, the control number upon comparison will not agree. Accordingly, relay coil PR (Fig. 9a) becomes deenergized when cam contacts FC—2 open. Relay contacts PR—1 (Fig. 9e) also become closed. The machine then proceeds with the multiplication of the multiplicand derived from the last detail card of the previous group by the multiplier amount already standing in the MP accumulator. Upon completion of multiplying computations and during the time the punching section of the machine is in operation, cam contacts PMB (see Figs. 9e and 10a) become closed to complete a circuit to both the 210MP and the 210MC reset magnets. Upon such magnets being energized the old multiplier and the old multiplicand amounts which were derived from the cards of the previous group are cleared out of their respective accumulators. Following the punching operations pertaining to the last detail card of the previous group there is initiated a new card feed cycle. Such card feed initiation is effected by the closure of cam contacts PMF (Fig. 9e). It is during this re-initiated card feed cycle that the multiplier from the new multiplier card is entered into the MP accumulator under the control of brushes 84.

What I claim is:

1. A record controlled multiplying accounting machine with multiplying devices, multiplicand receiving means for controlling the same, multiplier entry receiving means for also controlling the operation of the aforesaid multiplying devices for one or more calculations, means for resetting the multiplier entry receiving means, means effective when the multiplier entry receiving means is not being reset for automatically re-initiating a new multiplying computation after a preceding computation has been completed, means operable upon one entry of a multiplier into the multiplier entry receiving means for thereafter automatically cutting off the entries of further amounts into the multiplier entry receiving means, record controlled means for detecting changes in group numbers for each successive record and means controlled thereby effective upon the reading of a change in group numbers of the records for enabling clearing of the multiplier entry receiving means and means effective upon clearing of the multiplier entry receiving means for suppressing the re-initiation of a new multiplying computation and for re-establishing the receiving relation between the multiplier entry receiving means and the record reading means so that a new multiplier may be entered into said receiving means.

2. A record controlled multiplying accounting machine, including record sensing means for sensing records of different identifying characteristics, record controlled factor receiving means, multiplying devices controlled thereby, control devices for said multiplying devices automatically eliminating dummy multiplying operations by the multiplying devices, means brought into operation upon identification of a first card of a group, means effective upon operation of said last named means for calling said control devices into operation to invariably eliminate all dummy multiplying operations for each first card of a group irrespective of what factor data may appear thereon.

3. A record controlled multiplying accounting machine, including record controlled multiplicand and multiplier factor manifesting means, multiplying devices controlled thereby for effecting a series of separate multiplying computations, operation control means for controlling each computation by the multiplying devices, means for controlling the multiplier manifesting means to retain a multiplier therein whereby successive calculations may be performed, means for causing operation of said operation control means for successive calculations, record controlled group number sensing means for sensing group number designations upon the records which contain factor data, group number control means controlled thereby, means controlled by the group number control means upon a change in group numbers upon the records for enabling reset of the multiplier manifesting means and means effective upon reset of said manifesting means for automatically terminating one series of multiplying operations and for conditioning the operation control means for the initiation of a new and different series of multiplying computations.

4. A record controlled multiplying accounting machine adapted for master and detail card control with manifesting means for factors derived from record cards, multiplying devices controlled by said manifesting means, cycle control means for the multiplying devices, said cycle control means in the event of a manifested multiplifier containing significant digits and in the event of zeros only being manifested for the multiplicand tending to initiate a series of dummy multiplying operations, means brought into operation upon identification of a master card, and means effective upon operation of said last means to control the said cycle controller to prevent such undesired dummy multiplying operations upon entry of the multiplier from the master card.

5. A record controlled multiplying accounting machine, including a cycle controller adapted to normally control a series of multiplying cycles of the machine for each record handled by the machine, said cycle controller also normally tending to initiate dummy multiplying operations for computations involving a significant figure multiplier and a zero multiplicand factor, record feeding means with means for initiating operation thereof, record controlled means for detecting changes in identifying characteristics upon the record and operation modifying means controlled thereby for controlling the cycle controller for eliminating dummy multiplying operations during multiplying computations which would otherwise be effected under the control of the cycle controller and for calling into operation a train of devices which causes operation of the record feed initiating means.

6. In a record controlled multiplying machine with record handling devices, record reading devices, factor entry receiving means controlled thereby, multiplying devices controlled by the factor receiving means with result receiving means for controlling punching operations, a punching section mechanism controlled by said means, with control means for the aforesaid means for causing first a record handling operation, thereafter one or more multiplying cycles and thereafter a cycle of operation of the punching section, which in turn initiates a new record handling operation, said control means including a cycle controller controlled by one entry receiving means and which cycle controller upon significant digits being received upon said entry receiving means with a zero setting of the other receiving means tends to cause dummy multiplying operations, and including in combination cooperating control means one for controlling the cycle controller to suppress said dummy multiplying operations and the other to initiate a cycle of operation of the punching section directly following record handling, supplemental record reading means, and detecting means controlled thereby for detecting identifying characteristics on the cards signifying first and successive cards of a group, and means controlled by said detecting means upon detecting the first card of a group for enabling said cooperating control means.

7. A record controlled multiplying and accounting machine adapted for master and detail card control with reading means and record controlled factor manifesting means and multiplying devices controlled thereby, cycle control means therefor for determining multiplying cycles and normally tending upon the passage of the first card with insufficient factor data thereon to cause dummy multiplying operations, record feeding devices, means for initiating record feeding operations, supplemental reading means and means controlled thereby to detect the first card of a group, means controlled by said last-mentioned means and including intervening controls which are effective upon the reading of a first record of each group, which record of itself does not require a series of multiplying operations of the multiplying devices for modifying the cycle controller control to eliminate dummy multiplying operations, and for calling means into operation, which through intervening means effects operation of the record feed initiating means.

8. A multiplying machine capable of eliminating blank operations comprising factor manifesting means, multiplying means controlled thereby, a cycle controller for said multiplying means controlled by one of the factor manifesting means and tending to initiate multiplying operations with significant digit amounts manifested on both manifesting means and also tending to cause dummy multiplying operations when significant digit amounts are manifested in the controlling manifesting means with a zero setting of the other manifesting means; and including in combination, means for controlling said cycle controller to suppress dummy multiplying operations under said last mentioned conditions, means for controlling said last mentioned control means, and detecting means automatically rendered effective by movable control elements according to detected distinctive identifying characteristics thereof to cause automatic operation of said last means.

9. A mechanism according to claim 8 wherein the multiplying machine is of the record controlled type with record controlled means for the factor manifesting means and wherein the detecting means comprises means to sense identifying characteristics on the cards and to detect the first card of a group to thereby eliminate dummy multiplying operations upon the passage of a first card of a group.

10. In a record controlled multiplying accounting machine with record reading means, record controlled factor receiving means, multiplying means controlled thereby with result receiving means, with a cycle controller for the multiplying means, punching mechanism controlled by the aforesaid result receiving means, and means for feeding records; the aforesaid means including controls for normally feeding records, then causing one or more multiplying cycles, thereafter causing operation of the punching means, thereafter initiating a new record feeding operation; and including in combination means to modify the above successive operations to suppress multiplying cycles, to cause an operation of the punching mechanism directly following record feed and to cause a re-initiation of record feed following operation of the punching means, said means comprising supplementary record reading means, means controlled thereby to detect the first card of a group according to identifying characteristics on said cards, means controlled by said last named means to modify the action of the cycle controller to suppress multiplying operations and to cause a cycle of operation of the punching mechanism directly following record feeding.

11. A record controlled multiplying machine including record controlled multiplier and multiplicand receiving means, multiplying devices controlled thereby, operation control means for said multiplying devices including means for normally conditioning said operation controls for separate successive computations, disabling means for said operation and conditioning control means, control means for the multiplier factor receiving means, said last named control means and the disabling means cooperating to terminate one series of multiplying operations, said control means for the multiplier factor receiving means conditioning the multiplier factor receiving means for the receipt of a new multiplier, preparatory to a new series of operations, means to sense group numbers from all records carrying factor data, detecting means for detecting group number changes on the records, and means controlled by said detecting means for causing operation of the control means for the multiplier factor receiving means and subsequent operation of the disabling means to terminate one series of multiplying computations.

12. The invention according to claim 11 wherein the control means for the multiplier factor receiving means comprises clearing means for such receiving means and includes suppressing and enabling means for said clearing means controlled by the group number change detecting means to suppress reset so long as group numbers do not change and to enable reset upon group number change.

13. The invention according to claim 11 wherein entry transmitting means are provided for suppressing or enabling entries into the multiplier factor receiving means, means for controlling the said transmitting means for enabling a multiplier factor entry upon change in group numbers and means for thereafter suppressing further entries of such factor until the group numbers again change, said control means for enabling entry being under control of the control means for the multiplier factor receiving means.

14. A record controlled multiplying machine, including receiving means for the multiplier and multiplicand, reset means for said receiving means, control means for the multiplier reset means, multiplying devices controlled by both of the aforesaid receiving means, a cycle controller for controlling each computation by the multiplying devices and means for normally controlling the cycle controller and the reset control for the multiplier receiving means whereby successive calculations can be performed, record controlled group number reading means, group control means controlled by said reading means upon changes in group numbers upon records as read by said reading means for controlling the foregoing reset control means, and means effective upon reset of the multiplier receiving means for rendering effective said cycle controller control means to terminate successive multiplying operations.

GEORGE F. DALY.